(12) United States Patent
Chouhan et al.

(10) Patent No.: US 12,732,427 B2
(45) Date of Patent: Sep. 8, 2026

(54) CARBON FOOTPRINT REDUCTION BY QUANTIFYING AND MITIGATING DATA WASTE

(71) Applicant: Kyndryl, Inc., New York, NY (US)

(72) Inventors: Vishwas Chouhan, Bethpage, NY (US); Pawel Jasionowski, Wroclaw (PL); Madan Cheemakurthi, Bangalore (IN); Ramamuneeswar Kanala, Bangalore (IN); Savita Pathak, Pune (IN); Syed Faisal, Canton, MI (US); Manoj Kumar Joshi, Greater Noida West (IN); Ricardo Wenceslao Moreau Moreno, Chapala (MX); Sanjay Patel, Edison, NJ (US)

(73) Assignee: Kyndryl, Inc., New York, NY (US)

( * ) Notice: Subject to any disclaimer, the term of this patent is extended or adjusted under 35 U.S.C. 154(b) by 114 days.

(21) Appl. No.: 18/967,756

(22) Filed: Dec. 4, 2024

(65) Prior Publication Data

US 2026/0156032 A1 Jun. 4, 2026

(51) Int. Cl.
*H04L 41/0823* (2022.01)
*H04L 43/08* (2022.01)

(52) U.S. Cl.
CPC .......... *H04L 41/0823* (2013.01); *H04L 43/08* (2013.01)

(58) Field of Classification Search
CPC ............................ H04L 41/0823; H04L 43/08
See application file for complete search history.

(56) References Cited

U.S. PATENT DOCUMENTS

2008/0016503 A1 1/2008 Fairweather
2008/0168235 A1* 7/2008 Watson .................. G06F 9/544 711/135
2014/0082214 A1* 3/2014 Agarwal ................ H04L 67/62 709/240
2016/0026729 A1 1/2016 Gil et al.
2016/0028605 A1 1/2016 Gil et al.
(Continued)

FOREIGN PATENT DOCUMENTS

WO 2023137484 A1 7/2023

OTHER PUBLICATIONS

Bin Ratasha et al., "Towards Net Zero—Better Decision Making for Enterprise Leel Green House Gas (GHG) Emission Management and Accounting", International Petroleum Technology Conference, 2024, 3 pages. (Abstract Only).
(Continued)

*Primary Examiner* — Viet D Vu
(74) *Attorney, Agent, or Firm* — CANTOR COLBURN LLP; Erik Swanson

(57) ABSTRACT

An application programming interface (API) analysis system includes a data network and an API Carbon Footprint Analyzer (ACFA). The data network is configured to receive a call from a remote to onboard an application programming interface (API) in the data network and to obtain the API corresponding to the call. The ACFA is configured to scan the API to determine actual payload attributes and to compare the actual payload attributes to expected payload attributes of the API to determine a payload difference. The ACFA calculates an amount of data wastage based on the payload difference and causes a modification to the data network to reduce the amount of data wastage.

20 Claims, 6 Drawing Sheets

(56) References Cited

U.S. PATENT DOCUMENTS

| | | | | |
|---|---|---|---|---|
| 2016/0210427 | A1 | 7/2016 | Mynhier et al. | |
| 2017/0207926 | A1 | 7/2017 | Gil et al. | |
| 2019/0213117 | A1* | 7/2019 | Li | G06F 11/3684 |
| 2019/0265971 | A1 | 8/2019 | Behzadi et al. | |
| 2021/0034492 | A1 | 2/2021 | Rodriguez et al. | |
| 2021/0182275 | A1 | 6/2021 | Su et al. | |
| 2021/0263945 | A1 | 8/2021 | Siebel et al. | |
| 2023/0138727 | A1 | 5/2023 | Wong et al. | |
| 2023/0344707 | A1* | 10/2023 | Sowatskey | H04L 47/82 |
| 2023/0394507 | A1 | 12/2023 | Giroti | |
| 2023/0397038 | A1* | 12/2023 | Boodannavar | H04W 28/0236 |
| 2024/0103743 | A1 | 3/2024 | Guim Bernat et al. | |
| 2024/0135292 | A1 | 4/2024 | Iyer et al. | |
| 2025/0103479 | A1* | 3/2025 | Chebbi | G06F 1/3275 |

OTHER PUBLICATIONS

Chen et al., "Implementing an InfoSphere Optim Data Growth Solution", IBM Information Management Software, Redbooks, 548 pages.

Collin et al., "5G Innovations for Industry Transformation: Data-driven Use Cases", IEEE eBooks, 2024, 4 pages. (Abstract Only).

Dubuc et al., "Mapping the Big Data Landscape: Technologies, Platforms and Paradigms for Real-Time Analytics of Data Streams", IEEE Access, vol. 9, 2021, pp. 15351-15374.

Hussain et al., "Verifiable Sustainability in Data Centers", IEEE Security & Privacy, 2024, 14 pages.

Iancu et al., "Data Sharing in RoPax Ports: Challenges and Opportunities", IEEE Conference Publication, 2023, 4 pages. (Abstract Only).

Trakadas et al., "A Reference Architecture for Cloud-Edge Meta-Operating Systems Enabling Cross-Domain, Data-Intensive, ML-Assisted Applications: Architectural Overview and Key Concepts", Sensors, Nov. 21, 2022, 20 pages.

Varadharajan et al., "Challenges in Building an End-to-End System for Acquisition, Management, and Integration of Diverse Data From Sensor Networks in Watersheds: Lessons From a Mountainous Community Observatory in East River, CO", IEEE Access, 2019, pp. 182796-182813.

Watkins et al., "Standards Development in Support of Low Carbon Activities", Offshore Technology Conference, 2023, 3 pages. (Abstract Only).

Mohandas et al., "Solving Integrated Logistics Challenges Through a Digital Platform for Humanitarian Efforts", Society of Petroleum Engineers, Paper No. SPE-217023-MS, Oct. 2023, 3 pages. (Abstract Only).

* cited by examiner

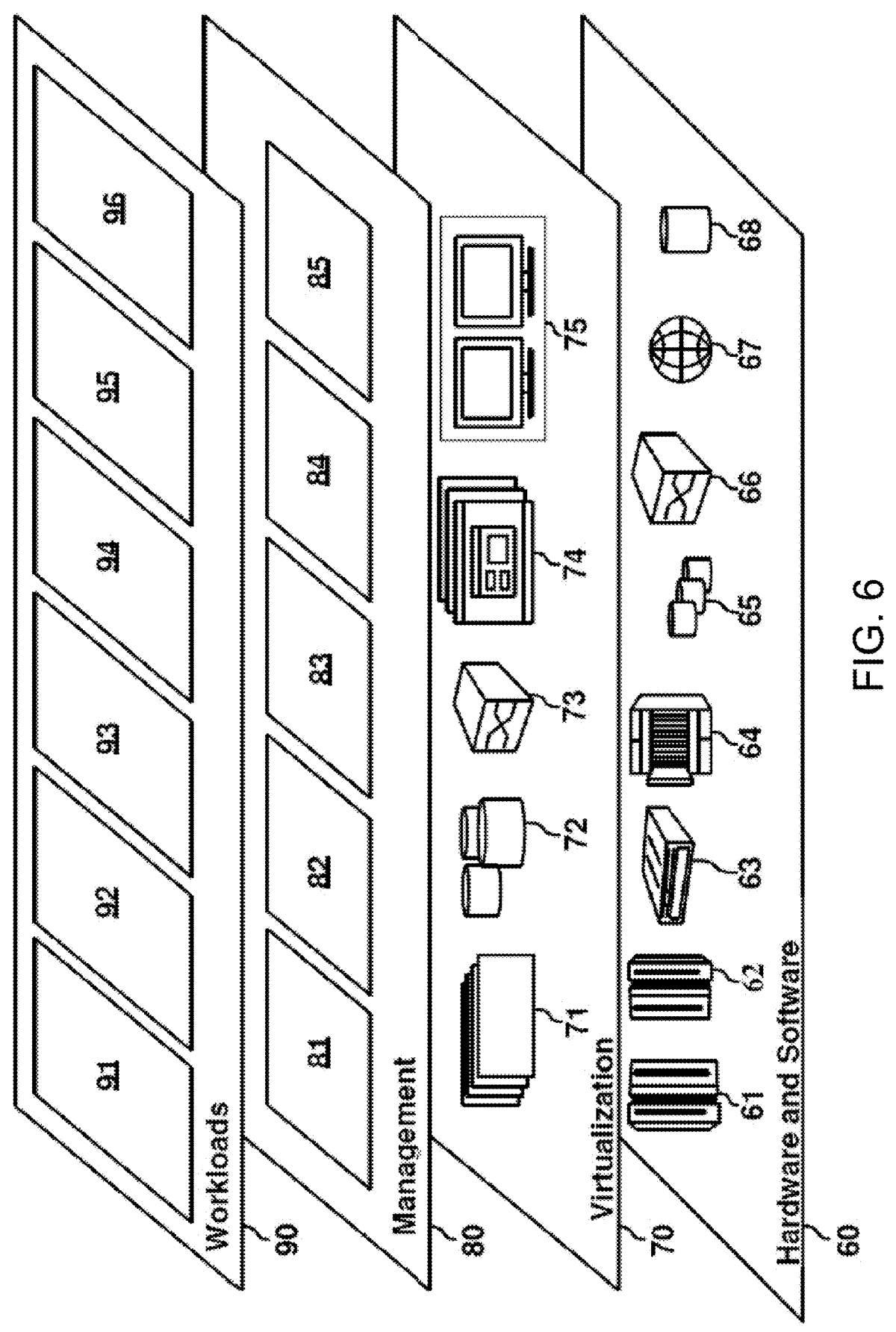

Workloads 90
91 92 93 94 95 96

Management 80
81 82 83 84 85

Virtualization 70
71 72 73 74 75

Hardware and Software 60
61 62 63 64 65 66 67 68

FIG. 6

CARBON FOOTPRINT REDUCTION BY QUANTIFYING AND MITIGATING DATA WASTE

BACKGROUND

The present invention generally relates to computer systems, and more specifically, to computer-implemented methods, computer systems, and computer program products configured to reduce carbon footprints in information technology systems.

As organizations increasingly focus on sustainability, there is growing attention on the carbon footprint within the digital realm. This includes evaluating the environmental impact of data management and the infrastructure that supports it. In IT environments, handling data efficiently involves various technical processes such as data storage, transmission, and processing. These processes rely on servers, networking equipment, and data centers, all of which consume significant amounts of energy. Advances in technology have enabled the handling of vast amounts of data, but this also requires substantial computational power and storage capacity. The efficiency of these systems is influenced by the way data is organized, accessed, and processed, which can impact energy usage.

SUMMARY

Embodiments of the present invention are directed to a system configured to quantify data wastage of an API. According to a non-limiting embodiment, a computer-implemented method comprises receiving from a client application a call to onboard an application programming interface (API) in a data network, obtaining the API, and scanning the API to determine actual payload attributes. The method further comprises comparing the actual payload attributes of the API to expected payload attributes of the API to determine a payload difference and calculating an amount of data wastage based on the payload difference. The method includes causing a modification to the data network to reduce the amount of data wastage.

According to another non-limiting embodiment, an application programming interface (API) analysis system includes a data network and an API Carbon Footprint Analyzer (ACFA). The data network is configured to receive a call from a remote to onboard an application programming interface (API) in the data network and to obtain the API corresponding to the call. The ACFA is configured to scan the API to determine actual payload attributes and to compare the actual payload attributes to expected payload attributes of the API to determine a payload difference. The ACFA calculates an amount of data wastage based on the payload difference and causes a modification to the data network to reduce the amount of data wastage.

According to yet another non-limiting embodiment, a computer program product to control an application programming interface (API) analysis system to perform data analysis, the computer program product comprising a computer readable storage medium having program instructions embodied therewith, the program instructions executable by an electronic computer processor to control the API analysis system to perform operations. The operations comprising receiving from a client application a call to onboard an application programming interface (API) in a data network, obtaining the API, and scanning the API to determine actual payload attributes. The operations further comprise comparing the actual payload attributes of the API to expected payload attributes of the API to determine a payload difference and calculating an amount of data wastage based on the payload difference. The operations comprise causing a modification to the data network to reduce the amount of data wastage.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts abstraction model layers in accordance with one or more embodiments of the present disclosure.

DETAILED DESCRIPTION

Figure 1:
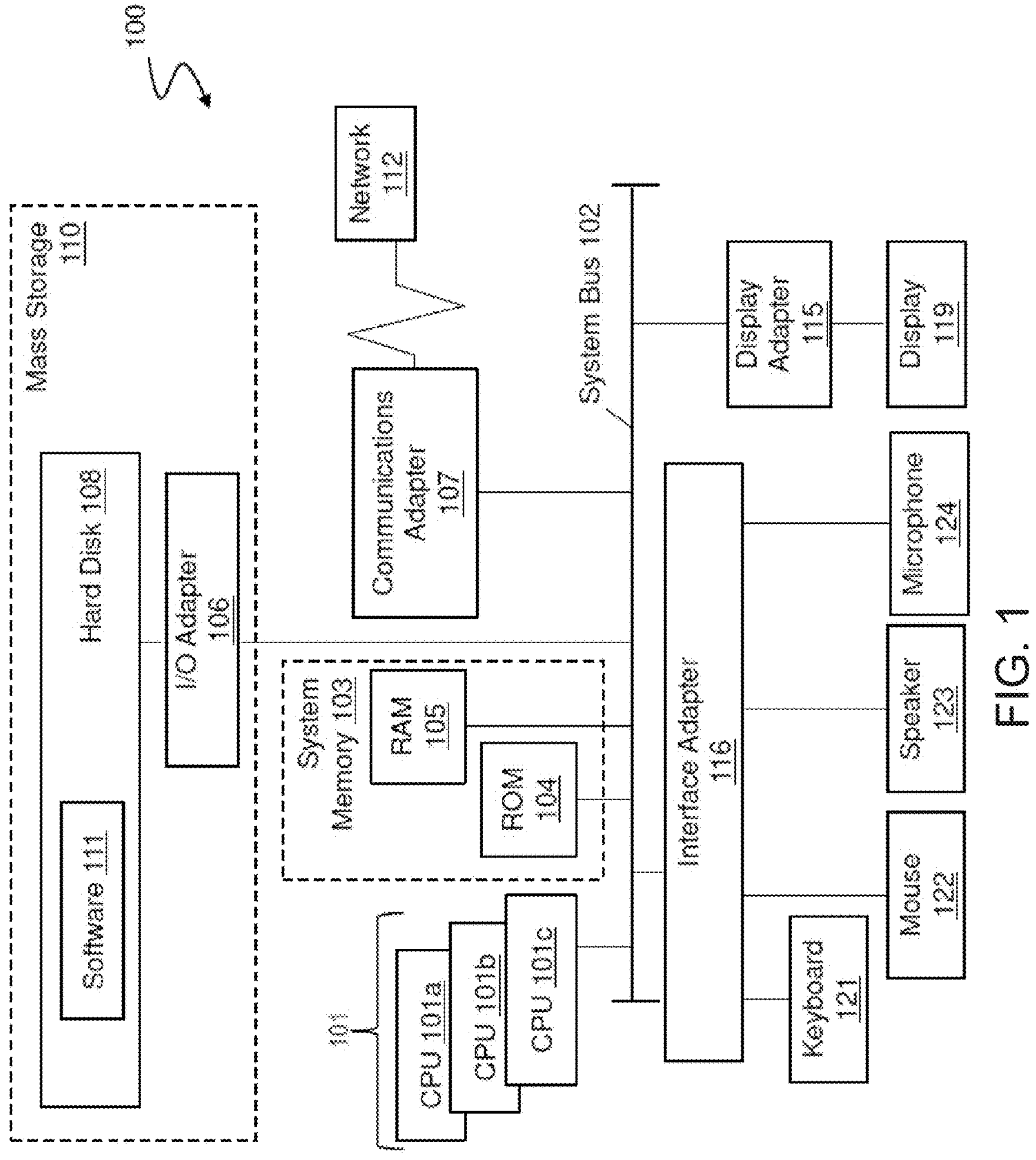
FIG. 1 depicts a block diagram of an example computer system for use in conjunction with one or more embodiments of the present disclosure.

One emerging area of concern is the carbon footprint associated with digital activities, particularly in the context of IT infrastructure and data management. Application Programming Interfaces (APIs) have been developed to estimate the environmental impact of physical products, solutions, and applications. These tools help organizations measure and manage their carbon emissions more effectively to align with their Environmental, Social, and Governance (ESG) initiatives.

An aspect often overlooked in API development, however, is the carbon footprint associated with data usage within the APIs themselves, including the carbon impact caused by data duplication and/or data waste, unnecessary data transfers, and inefficient data processing. In many IT environments, excessive data generation (sometimes referred to as "data wastage") and the transmission of redundant information lead to increased energy consumption, both during processing and in data storage. These inefficiencies contribute to a larger carbon footprint, which counteracts the sustainability goals of organizations.

One technical challenge, among other, lies in identifying and minimizing data wastage that may occur during API calls. APIs, being integral to modern software applications, often facilitate interactions between different systems and services within an organization. With hundreds of thousands of API interactions taking place, data that is duplicated, unnecessary, or inefficiently processed can lead to significant energy consumption. This waste not only impacts the performance and efficiency of IT infrastructure but also contributes to higher operational costs and a larger carbon footprint at the data center level.

Various non-limiting embodiments of the present disclosure provide a system and method configured to quantify this surplus data and implement strategies to reduce it. For example, a non-limiting embodiment of the system described herein can perform a method of identifying and minimizing data wastage in API calls by quantifying data transmitted across API transactions and expected payload attributes. A non-limiting embodiment of the system described herein can also dynamically compare received data against expected inputs and API identifiers and use the results of the comparison to quantify data wastage to ensure sustainability. By optimizing data usage, the system can enhance resource utilization and lower the overall carbon footprint of API interactions. Various non-limiting embodiments of the present disclosure not only support sustainability initiatives but also contribute to cost savings and improved efficiency in managing digital resources, thereby causing computer systems to use less bandwidth, reduce the number of input/output operations, and execute faster. By fostering more sustainable digital ecosystems, organizations can align their operational practices with broader environmental goals, contributing to a greener and more responsible technological landscape.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In a non-limiting embodiment of the present disclosure, an API data analysis system employs an API data analysis agent that operates along with an API manager. This API data analysis agent conducts a comprehensive scan of each API and creates metadata containing unique identifiers and expected payload attributes. During runtime, it dynamically compares received data against expected inputs, identifying and quantifying data wastage. According to a non-limiting embodiment for an example scenario, the API retrieves comprehensive product details for use by a client application from a database, including the name, description, price, and availability, and can determine that the client application only displays a sub-set of the product details (e.g., only the product name and price) such that the rest of the data will be effectively unused. This results in unnecessary data being transmitted and processed, leading to higher CPU and network usage. Accordingly, the API data analysis agent can determine the average size of a product record based on historical data (e.g., the average size of a product record may be determined to be 500 bytes). The API data analysis agent can determine that only 40% of the data typically obtained from the database is utilized and determine that 60% of the data is wasted. This translates to a quantified data wastage percentage of 60%, which contributes to increased energy consumption and a larger carbon footprint. According to a non-limiting embodiment, a set unit of bytes can equate to an amount of carbon emissions (e.g., $CO_2$), which is indicative of the carbon footprint associated with the data network (e.g., the remote server). For example, each gigabyte (GB) of excess data (e.g., bytes of data associated with data wastage) equates to 3 kgs of $CO_2$ emission.

Accordingly, the API data analysis agent is embedded in the API described herein to facilitate scalability, which is central for data centers processing millions of API calls daily. By calculating and presenting data wastage metrics through intuitive dashboards, the system facilitates the optimization of resource utilization, mitigates carbon emissions, and bolsters operational efficiency. In addition, the system described herein improves data management practices by identifying wastage down to the API level, thereby ensuring sustainability and resilience in the digital ecosystem. By modifying the data network (e.g., remote server) to uninstall the API from the data network, there is a reduction in energy consumption, CPU usage, memory usage, network bandwidth, etc., in the data network. In one or more embodiments, a more efficient API is selected and installed on the data network thereby providing at least one improvement in the functioning of one or more computer systems executing APIs in the data network.

With reference now to FIG. 1, a computer system 100 is generally shown in accordance with one or more embodiments of the invention. The computer system 100 can be an electronic computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, a desktop computer, a laptop computer, a tablet computer, or a smartphone. In some examples, the computer system 100 may be a cloud computing node. The computer system 100 may be described in the general context of computer system executable instructions, such as program modules, being executed by a computer system. Generally, program modules may include routines, programs, objects, components, logic, data structures, and so on that perform tasks or implement abstract data types. The computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101*a*, 101*b*, 101*c*, etc., (collectively or generically referred to as processor(s) 101). The processors 101 can be a single-core processor, a multi-core processor, a computing cluster, or any number of other configurations. The processors 101, also referred to as processing circuits, are coupled via a system bus 102 to a system memory 103 and various other components. The system memory 103 can include a read only memory (ROM) 104 and a random-access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

The software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
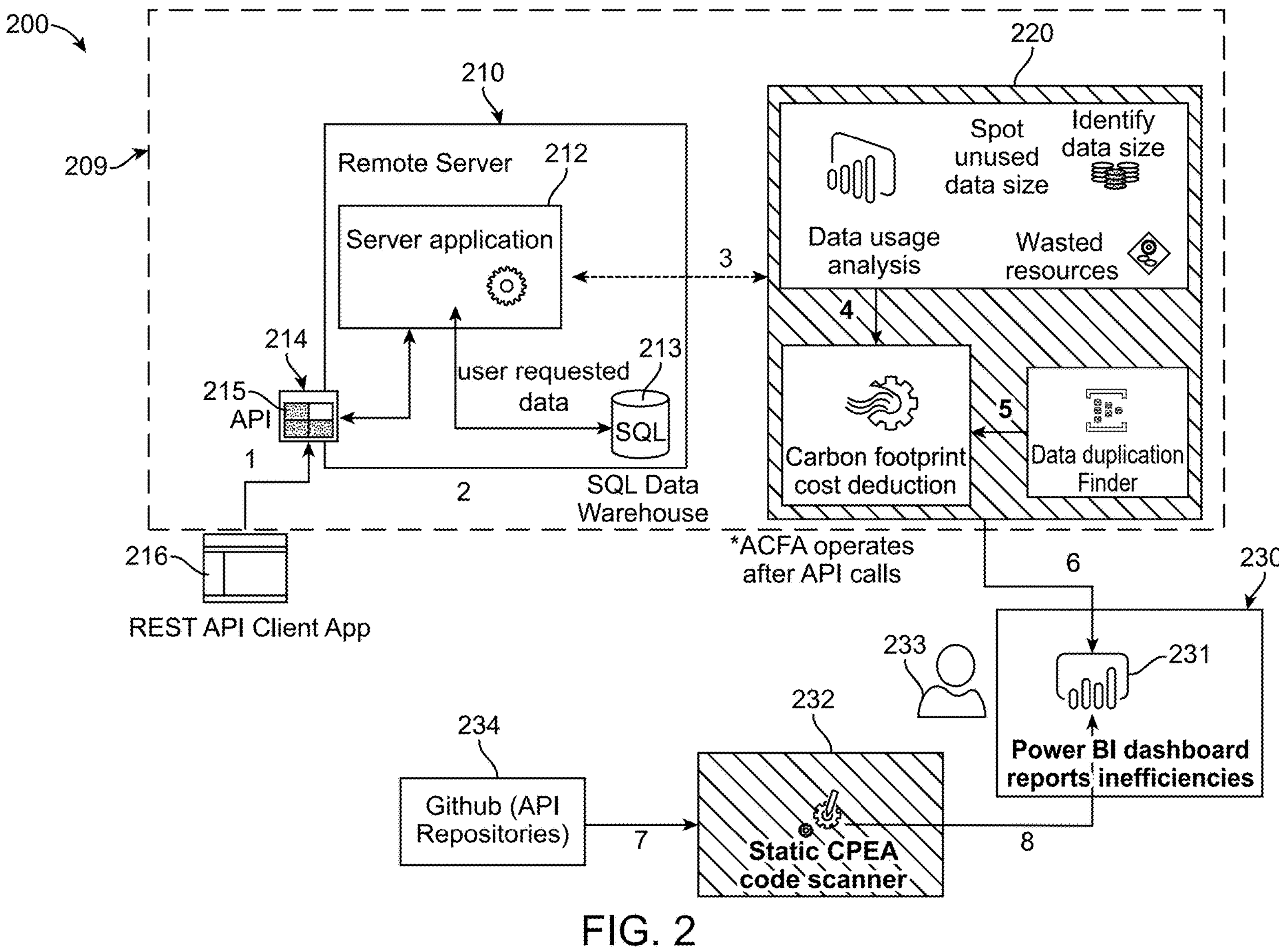
FIG. 2 depicts a block diagram of an API data analysis system according to a non-limiting embodiment of the present disclosure.

Turning to FIG. 2, an API data analysis system 200 is illustrated according to a non-limiting embodiment of the present disclosure. The API data analysis system 200 monitors data usage of a data network 209, which includes a remote server 210. The remote server is in signal communication with an API Carbon Footprint Analyzer (ACFA) 220 and a workstation 230. The remote server 210, the API Carbon Footprint Analyzer 220, and/or the workstation 230 manages apps, warehouses, clients, APIs, agents, etc., using the functionality and features of the computer system 100 in FIG. 1. For example, the remote server 210, the API Carbon Footprint Analyzer 220, and/or the workstation 230 can include various hardware components and various software applications of the computer system 100 such as software 111 that can be executed as instructions on one or more processors 101 in order to perform according to one or more embodiments. As described herein, the API data analysis system 200 performs API data analysis including data wastage calculation and data duplication/data waste identification to quantify data wastage and inefficiency that allows enterprises to optimize resource utilization, mitigate carbon emissions, and bolster operational efficiency.

The remote server 210 operates a server application 212, which communicates with a structured query language (SQL) data warehouse 213 and an API manager (APIM) 214 that communicates with one or more API client applications (e.g., client Apps) 216. The API client Apps 216 are built according to various API architectures including, but not limited to, Representational State Transfer (REST), Simple Object Access Protocol (SOAP), Remote Procedure Call (RPC), g-Remote Procedure Calls (gRPC), and WebSocket.

The server application 212 manages communication between the SQL data warehouse 213 and API client Apps 216. In a non-limiting embodiment, the server application 212 can identify API endpoints to API client Apps 216 and manage incoming API call requests. The server application 212 also constructs SQL queries based on the API client App requests, executes them against the SQL data warehouse 213, and retrieves the necessary data. The retrieved data is then processed and formatted into a client-friendly format (e.g., JSON), and sent back to the API client Apps 216. In this manner, the server application 212 enables secure, efficient data exchange between API client Apps 216 and the SQL data warehouse 213.

In a non-limiting embodiment, the server application 212 retrieves data from the SQL warehouse 213 based on API requests or "calls" provided by an API client App 216. The retrieved data includes, for example, product information or other relevant data sets that are necessary for client applications.

The server application 212 supports multiple HTTP methods, endpoints, data formats, and protocols, while also designed to handle a wide variety of request types to meet different client needs and operational requirements. For example, the server application 212 processes API requests including standard HTTP methods (e.g., GET, POST, PUT, DELETE, etc.) for CRUD operations, various endpoints for different resources, query parameters and filters for data refinement, and the server application 212 provides support for different data formats (e.g., JSON, XML, etc.) and protocols (e.g., HTTP/HTTPS, WebSockets, gRPC, etc.). Additionally, the server application 212 is capable of processing requests involving authentication and authorization methods, asynchronous and batch operations, error handling, versioned APIs, conditional requests, internationalization, specialized operations like search and analytics, security-related and mobile-specific requests, streaming data, and third-party integrations. In this manner, the server application 212 can interact efficiently with API client Apps 216 and manage data retrieval, modification, and transmission with the SQL data warehouse 213. This flexibility also allows for robust, scalable, and efficient communication between the application server 212 and API client Apps 216 to accommodate various use cases and optimize performance.

The APIM 214 manages onboarding of one or more APIs 215 called or requested from the API client App 216. As described herein, "onboarding" refers to adding APIs (e.g., API client Apps 216) to an API manager (e.g., APIM 214). In a non-limiting embodiment, the API data analysis system 200 hosts multiple APIs on a single instance of APIM 214 by actively onboarding new APIs. Each API 215 operates according to a respective API definition, which outlines the defined elements of the API's functionality. The defined elements outlined by an API definition include, but are not limited, the endpoints of the API 215, request and response formats, data structures, authentication methods, error handling procedures, and actual payload attributes. As descried herein, an actual payload attribute is a specific field or property that is part of the data structure exchanged between the API client App 216 and the API 215. In a non-limiting embodiment, an actual payload attribute is explicitly defined in the API definition with details including, but not limited to, the attribute name, the data type, and the data format.

The APIM 214 provides an open API definition of a called API 215, which allows the ACFA 220 to read the definition file that identifies one or more endpoint(s). Accordingly, the remote server 210 handles requests, manages database connections, and ensures secure data transfer between backend systems and the API client Apps 216. The remote sever 210 also captures details about each called API 215, logs the details, and/or sends the details to the ACFA 220 for further analysis as described below. The details include, but are not limited to, the size of the data requested, the size of the data sent, and whether the API client Apps 216 are utilizing the received data effectively.

The ACFA 220 operates as an "agent" capable of performing API data usage analysis and data duplication and/or data waste identification. For example, the ACFA 220 continuously monitors API interactions to perform the API data usage analysis and data duplication/data waste identification. By examining both real-time data and historical trends, the ACFA 220 determines the average size of data packets sent via the APIM 214 and calculates how much of this data is actually utilized by a client application. The real-time data includes, but is not limited to, current API call details such as timestamps, endpoints accessed, request and response payload sizes, data fields requested, data sent, data utilization, immediate unused data detection, performance metrics like response time and error rates, and client behavior monitoring. The historical data includes, but is not limited to, average payload sizes over time, data utilization rates, trend lines, data duplication patterns, cumulative data wastage, carbon footprint estimations, inefficiency hotspots, impact assessments of changes, and predictive analytics like forecasting and anomaly detection.

According to a non-limiting embodiment, the ACFA 220 tracks the size of data being transferred in each API call request and compares it to the data actually used by the client application. For instance, if a request returns a product's name, description, price, and availability, but only the name and price are displayed, the ACFA 220 identifies the unused portion of the data. The ACFA 220 then calculates the percentage of unused data (e.g., a data wastage percentage) and estimates the wasted resources, such as processing power, electrical power, memory usage, and network bandwidth.

The data duplication/data waste identification involves scanning data sets for redundant information being transmitted across multiple API calls. By identifying and flagging duplicate data transmissions, the ACFA 220 identifies inefficiencies that could be optimized to reduce unnecessary data traffic. According to a non-limiting embodiment, the ACFA 220 analyzes a response payload at runtime and compares the API definition file (which includes "actual payload attributes") against the expected parameters/attributes (also referred to as "expected payload attributes") in the response payload to identify a payload difference, e.g., parameter and/or attribute mismatches. Any payload differences (e.g., discrepancies or mismatching) resulting from the comparison are identified as "unused attributes". In a non-limiting embodiment, the ACFA 220 analyzes the response payload at runtime by intercepting the API responses as they are sent from the server application 212 to the API client App 216. The ACFA 220 then extracts the actual payload attributes included in the response and compares them against the expected payload attributes specified in the API definition of the called API 215.

Based on the comparison, the ACFA 220 calculates an amount of carbon waste (e.g., wastage percentage) of the payload, which allows the ACFA 220 to classify the API call as either an ESG compliant API or a non-ESG compliant API. For example, any API 215 associated with an amount of excess data or data wastage percentage is determined by the ACFA 220 as a non-ESG compliant API. In another example, the amount of excess data or data wastage percentage is compared to a data wastage threshold. When the calculated amount of excess data or data wastage percentage exceeds the data wastage threshold, the ACFA 220 determines that the API 215 is a non-ESG compliant API. In one or more non-limiting embodiments, the ACFA 220 allows onboarding of the called API 215, or automatically onboards the called API 215, in a data network (e.g., in the remote server 210) when it is determined to be an ESG compliant API. In another non-limiting embodiment, the ACFA 220 automatically offboards (also referred to as "decommissioned") or blocks an API 215 from being onboarded to the data network (e.g., the remote server 210) when the called API 215 is determined to be a non-ESG compliant API. In this manner, the API data analysis system 200 provides at least one tangible result (e.g., a realized optimization of API calls by omitting and avoiding operation of non-ESG compliant APIs) that produces a tangible advantage in terms of physically reducing carbon footprints and improving data process efficiency having reduced data wastage. In one or more embodiments, when the calculated amount of excess data or data wastage percentage exceeds the data wastage threshold, the ACFA 220 is configured to cause called API 215 having the excess data or data wastage to be uninstalled from the remote server 210 and/or to be temporarily paused or blocked from operating on the remote server 210. In one or more embodiments, the ACFA 220 is configured to cause the remote server 210 to select a more efficient API that performs the necessary functions of the called API 215 without the unnecessary functions (e.g., with less or reduced data wastage). The ACFA 220 is configured to cause the remote server 210 to replace the called API 215 with more efficient API by installing the more efficient API on the remote server 210. By modifying the data network 209 (e.g., remote server 210) to uninstall the called API 215 from the data network 209, the more efficient API executes with reduced energy consumption, reduced CPU usage, reduced memory usage, reduced network bandwidth, etc., in the data network 209. According to one or more embodiments discussed herein, technical effects and solutions provide an improved functioning of one or more computer systems executing APIs in the data network.

Based on the API data usage analysis and the data duplication/data waste identification, the ACFA 220 performs data wastage calculations and/or carbon emissions (e.g., carbon footprint) cost calculations, which are delivered to the UI 231. The carbon footprint cost calculation is quantified as an estimate of the carbon footprint or carbon ($CO_2$) emissions associated with data wastage. For example, the ACFA 220 utilizes predefined algorithms and metrics to convert data inefficiencies into carbon footprint metrics, which are then quantified as energy consumption equivalents or carbon emissions. According to a non-limiting embodiment, the ACFA 220 multiplies total energy consumption by a carbon intensity factor to convert energy usage into estimated carbon emissions. For example, the following equation can be utilized to compute estimated carbon emissions:

$$\text{Carbon Emissions (kg } CO_2) = \text{Total Energy Consumption (kWh)} \times \text{Carbon Intensity Factor} \left(\text{kg } CO_2/\text{kWh}\right).$$

Carbon intensity factors are known to be published by various agencies such as, for example, the Environmental Protection Agency (EPA). The total energy consumption can be computed using various energy consumption formulas including, but not limited to data transfer energy consumption, server processing energy consumption, data storage energy consumption, network infrastructure energy consumption, and any combination thereof.

The data transfer energy consumption formula is defined as follows:

$$\text{Unused Data (GB)} = \frac{\text{Total data transferred} \times \text{Percentage of data used}}{100}$$

The server processing energy consumption formula is defined as follows:

$$\text{Energy Consumption (kWh)} = \left(\frac{CPU \text{ power rating (W)} \times \text{Unused processing time (s)}}{3600}\right)$$

The data storage energy consumption formula is defined as follows:

$$\text{Energy Consumption (kWh)} = \text{Unused data stored} \times \text{Storage energy intensity}$$

The network infrastructure energy consumption formula is defined as follows:

$$\text{Energy Consumption (kWh)} = \text{Unused data stored} \times \text{Network energy intensity}$$

Once quantified, the information is compiled and sent to the UI 231 for reporting and/or further analysis, including identifying data wastage and corresponding carbon emissions.

The workstation 230 is in signal communication with the ACFA 220 and a static Class-Aware Patch Embedding Adaptation (CPEA) code scanner 232. The workstation 230 implements a user interface (UI) 231 that can be manipulated by a user 233. Accordingly, the UI 231 serves as a centralized dashboard that communicates with both the ACFA 220 and the static CPEA code scanner 232 and receives detailed reports on data usage inefficiencies and carbon footprint calculations from the ACFA 220. According to a non-limiting embodiment, the UI 231 provides real-time visualizations of data inefficiencies, displaying metrics such as the percentage of data wastage, the amount of duplicated data detected, and the associated carbon footprint. The UI 231 also provides actionable insights and recommendations on how to optimize API calls and data management practices to minimize carbon footprint and improve efficiency.

According to a non-limiting embodiment, the UI 231 provides actionable insights by identifying inefficiencies in API usage, such as unused data transfer, redundant data fetching, large payload sizes, high-frequency API calls, and inefficient data formats. For example, UI 231 generates a visual alert indicating that a significant percentage of data returned by certain endpoints is not utilized by an API client App 216 or that the same data is being repeatedly requested without changes. These insights help pinpoint specific areas where data usage can be optimized to reduce unnecessary processing and transmission. Based on these insights, the UI 231 offers recommendations to optimize API calls and data management practices. Suggestions include, for example, implementing field selections to allow API client Apps 216 to request only the data they need. In this manner, API client Apps 216 can employ mechanisms to minimize redundant data transfers, enable data compression to reduce payload sizes, and switch to more efficient data formats. The UI 231 also outputs data recommending replacing frequent polling with event-driven updates, remove unused fields from responses, and optimize server processing. In this manner, the UI 231 enhances API performance, reduces energy consumption, lowers operational costs, reduces memory usages, reduces CPU usages, and contributes to a smaller carbon footprint.

According to a non-limiting embodiment, the UI 231 displays the results from the CPEA code scanner 232. The CPEA code scanner 232 is a tool that statically analyzes code repositories for potential inefficiencies and processes API code to detect instances where excess data is fetched but not used or where redundant API calls are submitted. In one or more non-limiting embodiments, CPEA code scanner 232 is a static code analyzer with the capability to analyze the APIs implementation which may cause data wastage. The CPEA code scanner 232 checks code patterns against best practices for efficient data management and flags any issues that could lead to unnecessary data transfer and storage. CPEA code scanner 232 receives inputs from one or more GitHub repositories 234, continuously or on demand, to analyze the code structure and logic of API codes. After processing, the CPEA code scanner 232 generates reports that are sent to the UI 231. The UI 231 combines the scanner outputs with the ACFA's analysis (e.g., the data wastage calculations and/or carbon emissions), which can then be displayed to highlight problematic code snippets. The UI 231 (e.g., graphical dashboard) also provides actionable feedback for developers to point out specific areas in the code that require modification to enhance efficiency and optimizations. This feedback loop ensures that continuous improvements in API design are implemented.

Figure 3:
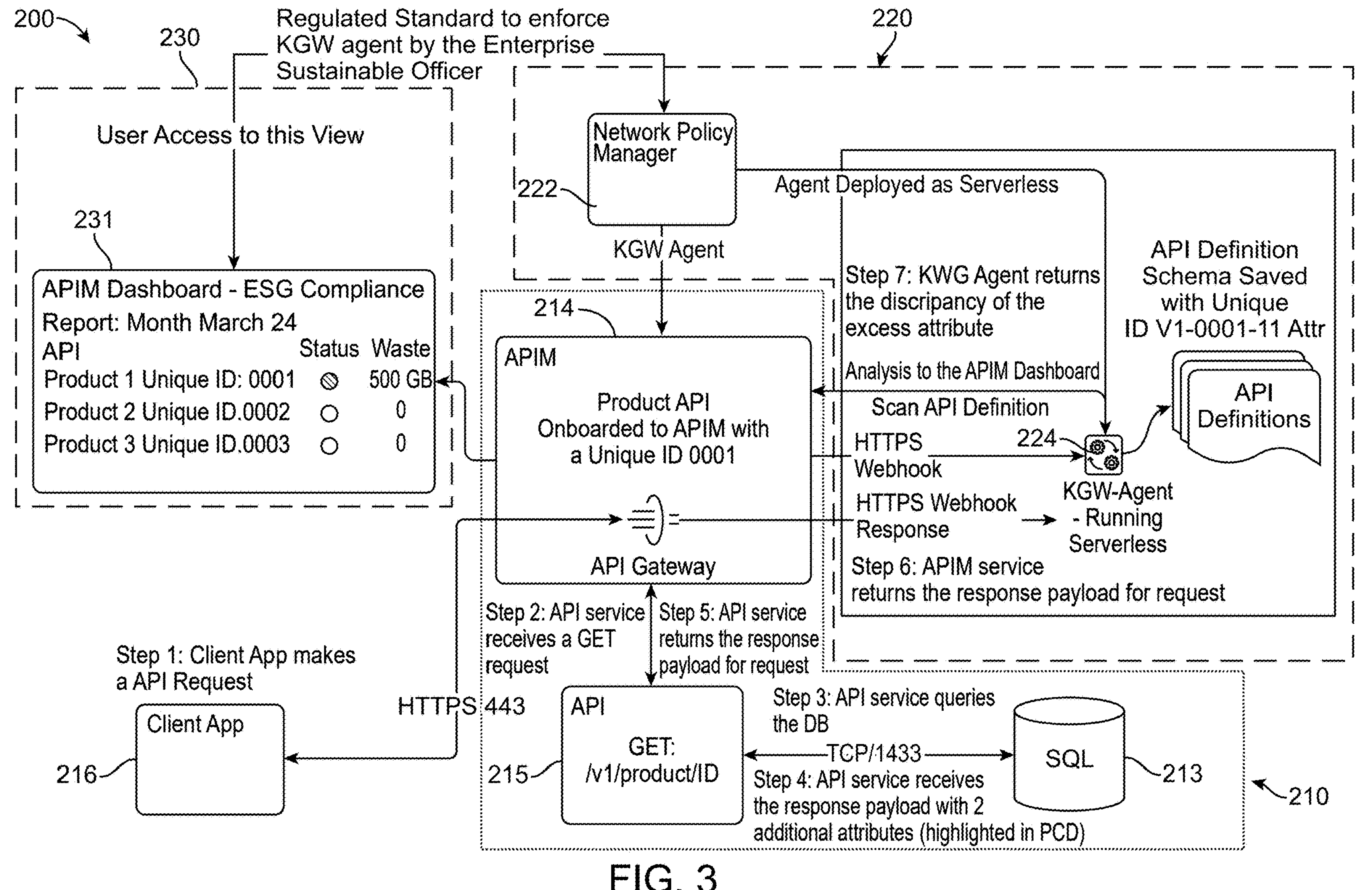
FIG. 3 depicts a process of analyzing API performed by an API data analysis system according to a non-limiting embodiment of the present disclosure.

Turning now to FIG. 3, a process of analyzing API data performed by the API data analysis system 200 is illustrated according to a non-limiting embodiment of the present disclosure. As described herein, data communication is established between the remote server 210, the ACFA 220, and the workstation 230 to convey quantified information relating to API data usage analysis and data duplication/data waste identification to a user. The quantified graphical information includes specific onboarded APIs 215, their data wastage information (if any), and their ESG compliance status (e.g., ESG compliant or ESG-non-compliant).

The ACFA 220 includes a network policy manager 222 and an API data analysis agent 224. The network policy manager 222 analyzes regulated network standards that govern operation of the API data analysis agent 224. Based on the network standards, the API data analysis agent 224 operates to compare the actual payload attributes included in the API definition against the expected payload attributes included in a response payload to identify a payload difference. As described herein, any payload differences (e.g., discrepancies or mismatches between the actual attributes and the expected payload attributes) resulting from the comparison are identified as "unused attributes".

With continued reference to FIG. 3, for example, a client application (App) 216 submits an API request or call to the APIM 214 to onboard a corresponding API (Step 1). The APIM 214 then submits a request to an API service provider for the called API 215 (Step 2). The API service provider queries the data warehouse 213 (step 3) and provides the called API 215 to the APIM 214 (Step 4), along with a response payload associated with the called API 215 (Step 5).

The API data analysis agent 224 receives the response payload from the APIM 214 (Step 6) and performs an API definition scan on the called API 215 to determine the actual payload attributes of the called API 215. The API data analysis agent 224 performs the API definition scan by analyzing the API definition to determine the defined elements of the API 215. As described above, the defined elements include the actual payload attributes of the called API 215. As described above, each actual payload attribute represents a specific field or property (e.g., attribute's name, data type, format, etc.) that is part of a data structure exchanged between an API client App 216 and the API 215. Accordingly, the API data analysis agent 224 analyzes the API's defined elements (e.g., endpoints, methods, data formats, authentication mechanisms, and actual payload attributes) to identify inefficiencies such as redundant data transfers or unnecessary complexity in data structures. By analyzing these elements, the API data analysis agent 224 is capable of detecting issues such as, for example, unused payload attributes, overly large response bodies, or inefficient authentication flows that contribute to increased latency and resource consumption. In one or more non-limiting embodiments, the scanned API results indicating the defined elements for the called API 215 are saved and indexed with a corresponding product ID and its attributes.

Next, the API data analysis agent 224 compares expected payload attributes to the actual payload attributes obtained from the API definition scan to determine any mismatches or discrepancies (Step 7). According to a non-limiting embodiment, the payload mismatches or discrepancies are quantified as a calculated data wastage percentage. The mismatches or discrepancies caused by access attributes are then returned to the APIM 214, which outputs them to the workstation 230 to be displayed as quantified graphical information on the UI 231.

Figure 4:
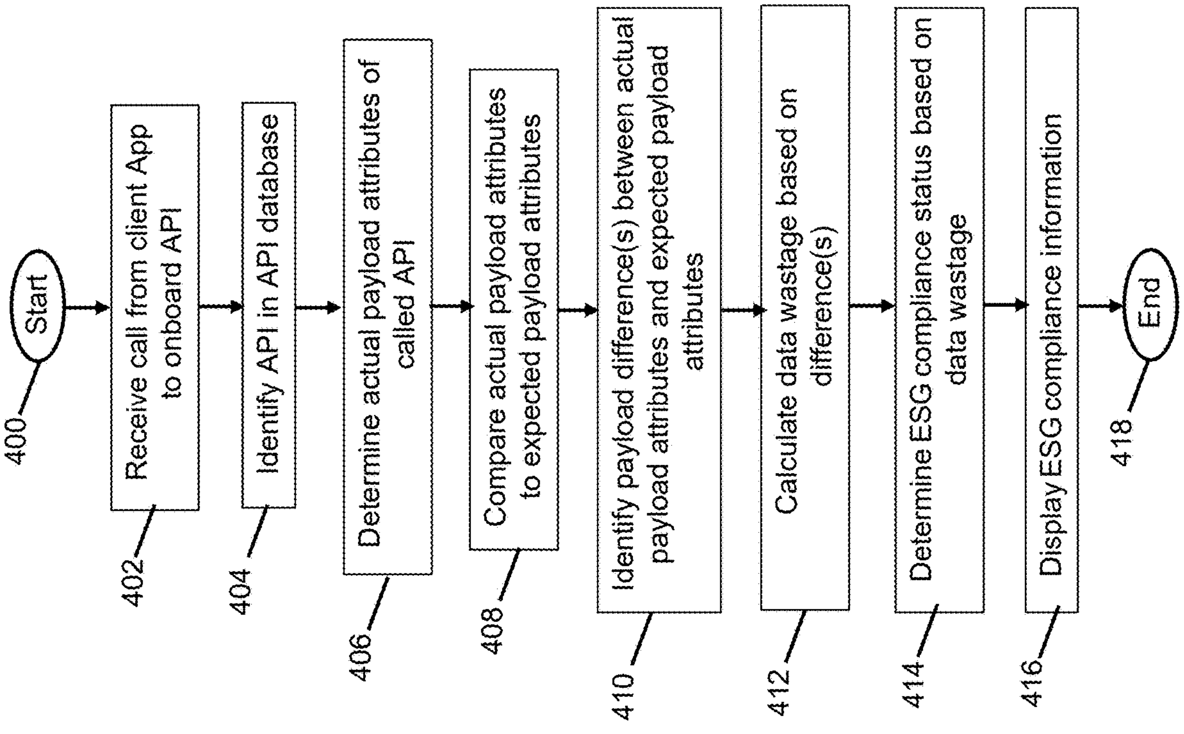
FIG. 4 is a flow diagram illustrating a method of quantifying and mitigating data waste in an IT network according to a non-limiting embodiment of the present disclosure.

Turning now to FIG. 4, a method of quantifying and mitigating data waste in an IT network is illustrated according to a non-limiting embodiment of the present disclosure. The method begins at operation 400 and a call to onboard an API is received from a client App at operation 402. At operation 404, an API database (e.g., SQL database) is accessed and the called API is identified. At operation 406, the actual payload attributes of the called API are determined and compared to the expected payload attributes of the called API at operation 408. At operation 410, differences between the actual payload attributes and the expected payload attributes are determined in real-time or near real-time, and a data wastage is calculated based on the differences at operation 412. At operation 414, the ESG compliance status (e.g., ESG compliant or ESG non-compliant) of the called API is determined to enforce policies that improve resource utilization, reduce carbon emissions, and improve operational efficiency.

At operation 416, the ESG information (e.g., ESG compliance status, amount of data wastage, etc.) of the called API is displayed (e.g., on a UI dashboard), and the method ends at operation 418. When the called API fails to comply with the ESG information (e.g., ESG compliance status, amount of data wastage, etc.), the called API is removed from the computer system, thereby improving the functioning of the computer system itself by reducing CPU usage, reducing memory, reducing input/output operations, and reducing network bandwidth.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
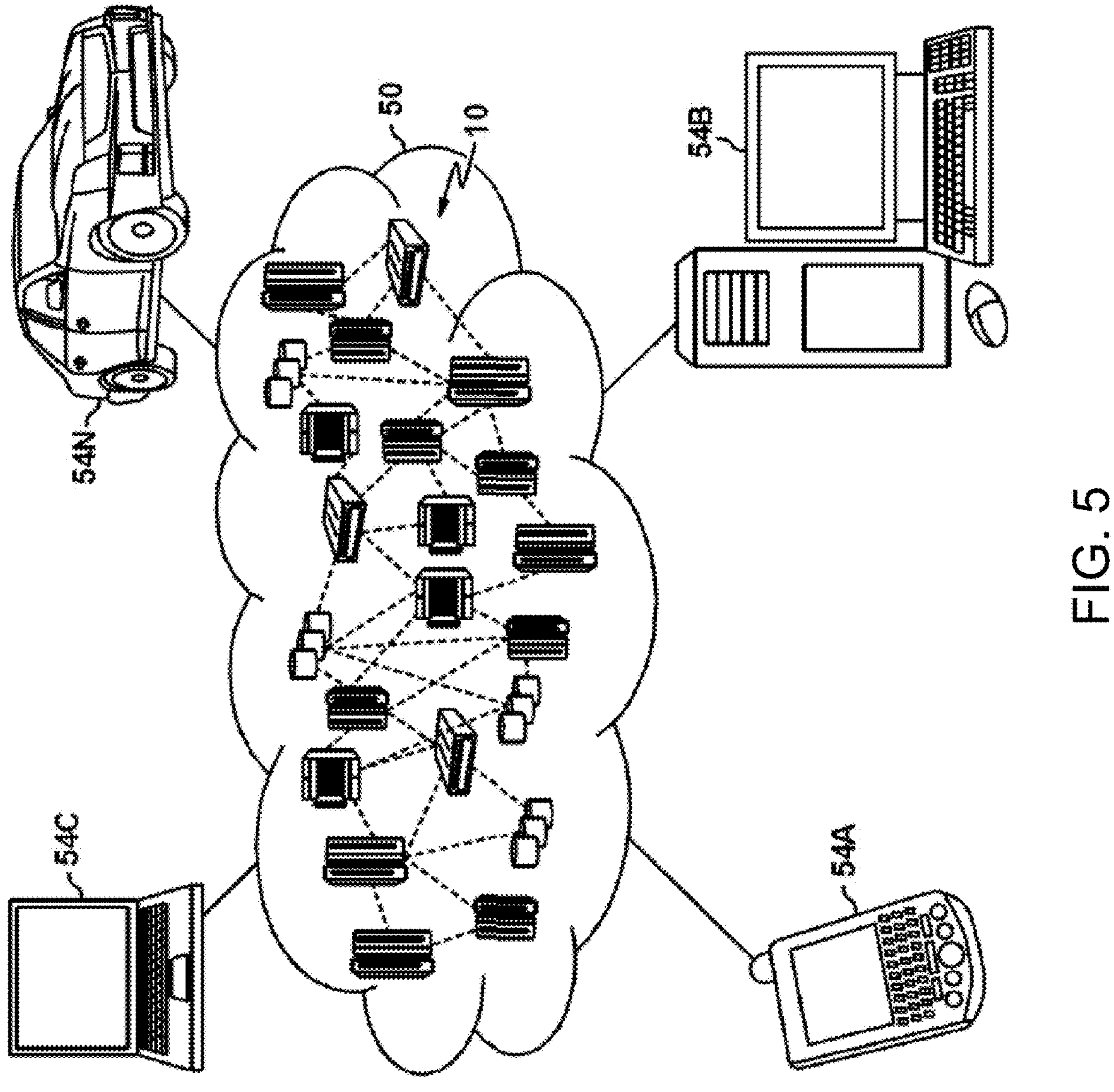
FIG. 5 depicts a cloud computing environment in accordance with one or more embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (depicted in FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96. Workloads and functions 96 can execute a system that calculates and presents data wastage metrics through intuitive dashboards to facilitate the optimization of resource utilization, mitigate carbon emissions, and bolster operational efficiency.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a" "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for the purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
- receiving from a client application a call to onboard an application programming interface (API) in a data network;
- obtaining the API and scanning the API to determine actual payload attributes;
- comparing the actual payload attributes of the API to expected payload attributes of the API to determine a payload difference;
- calculating an amount of data wastage based on the payload difference; and
- causing a modification to the data network to reduce the amount of data wastage.

2. The computer-implemented method of claim 1, further comprising determining an Environmental, Social, and Governance (ESG) compliance status of the API based on the amount of data wastage.

3. The computer-implemented method of claim 2, wherein the ESG compliance status is one of an ESG compliant API or an ESG non-compliant API.

4. The computer-implemented method of claim 1, further comprising performing one of onboarding the API in the data network in response to determining the API is an ESG compliant API or offloading the API from the data network in response to determining the API is an ESG non-compliant API.

5. The computer-implemented method of claim 1, further comprising displaying an ESG compliance status of the API and the amount of data wastage.

6. The computer-implemented method of claim 1, wherein causing the modification to the data network to reduce the amount of data wastage comprises uninstalling the API.

7. The computer-implemented method of claim 1, further comprising determining an amount of carbon emissions that corresponds to the amount of data wastage.

8. An application programming interface (API) analysis system, comprising:
- a data network configured to receive a call from a remote to onboard an application programming interface (API) in the data network and to obtain the API corresponding to the call; and
- an API Carbon Footprint Analyzer (ACFA) configured to:
  - scan the API to determine actual payload attributes;
  - compare the actual payload attributes to expected payload attributes of the API to determine a payload difference;
  - calculate an amount of data wastage based on the payload difference; and
  - causing a modification to the data network to reduce the amount of data wastage.

9. The API analysis system of claim 8, wherein the ACFA is configured to determine an Environmental, Social, and Governance (ESG) compliance status of the API based on the amount of data wastage.

10. The API analysis system of claim 9, wherein the ESG compliance status is one of an ESG compliant API or an ESG non-compliant API.

11. The API analysis system of claim 8, further comprising a remote server included in the data network and in signal communication with the ACFA, the remote server configured to perform one of onboard the API in the data network in response to determining the API is an ESG compliant API or offload the API from the data network in response to determining the API is an ESG non-compliant API.

12. The API analysis system of claim 8, further comprising a user interface (UI) configured to display an ESG compliance status of the API and the amount of data wastage.

13. The API analysis system of claim 8, wherein causing the modification to the data network to reduce the amount of data wastage comprises uninstalling the API.

14. The API analysis system of claim 8, wherein the ACFA is configured to determine an amount of carbon emissions that corresponds to the amount of data wastage.

15. A computer program product to control an application programming interface (API) analysis system to perform data analysis, the computer program product comprising a computer readable storage medium having program instructions embodied therewith, the program instructions executable by an electronic computer processor to control the API analysis system to perform operations comprising:
- receiving from a client application a call to onboard an application programming interface (API) in a data network;
- obtaining the API and scanning the API to determine actual payload attributes;
- comparing the actual payload attributes of the API to expected payload attributes of the API to determine a payload difference;
- calculating an amount of data wastage based on the payload difference; and
- causing a modification to the data network to reduce the amount of data wastage.

16. The computer program product of claim 15, further comprising determining an Environmental, Social, and Governance (ESG) compliance status of the API based on the amount of data wastage.

17. The computer program product of claim 16, wherein the ESG compliance status is one of an ESG compliant API or an ESG non-compliant API.

18. The computer program product of claim 15, further comprising performing one of onboarding the API in the data network in response to determining the API is an ESG compliant API or offloading the API from the data network in response to determining the API is an ESG non-compliant API.

19. The computer program product of claim 15, further comprising displaying an ESG compliance status of the API, the ESG compliance status includes displaying an amount of data wastage.

20. The computer program product of claim 15, further comprising determining an amount of amount of carbon emissions that corresponds to the amount of data wastage.

* * * * *